UNITED STATES PATENT OFFICE.

EDWARD DWIGHT KENDALL, OF BROOKLYN, NEW YORK, ASSIGNOR TO HIMSELF AND THE INTERNATIONAL OIL AND REFINING COMPANY OF MICHIGAN.

PROCESS OF REFINING HYDROCARBONS.

SPECIFICATION forming part of Letters Patent No. 451,660, dated May 5, 1891.

Application filed February 18, 1888. Serial No. 264,524. (No specimens.)

*To all whom it may concern:*

Be it known that I, EDWARD DWIGHT KENDALL, a citizen of the United States, residing at Brooklyn, in the county of Kings and State of New York, have invented a new and useful Process of Refining Hydrocarbons, of which the following is a specification.

The object of my invention is to refine liquid and liquefiable hydrocarbons—such as petroleum educts and products of petroleum and hydrocarbons obtained by the destructive distillation of bituminous shales and coals—by removing or changing the character of contained objectionable bodies, especially sulphur, containing compounds, whereby the hydrocarbons are improved in odor, color, and, with regard to illuminating-oils, in burning qualities.

I apply my process to "mineral hydrocarbons;" but in the following description I will refer particularly to the so-called "distillates" or crude burning-oils obtained from petroleum, using the term, however, not only to indicate lamp-oils, but to represent also hydrocarbons of greater and less densities and of different origins.

My process consists in treating the distillate with an aqueous solution of mercuric chloride, known also as "corrosive sublimate," the chemical formula of which is $HgCl_2$, in then removing the absorbed mercury from the distillate in the form of sulphide of mercury, and in then treating the distillate, after or without redistillation of the same over alkaline matter, by the usual method with sulphuric acid, water, and dilute solution of alkali, with such intermediate and final washings with water as may be most advantageous with particular distillates.

My process is conducted substantially as follows: A quantity of mercuric chloride sufficient to refine the particular distillate under treatment is to be dissolved in water, and this solution is to be mixed with the distillate by any effective means—for example, by putting the liquids together in a tank and agitating them with revolving paddles, or by forcing air or steam through them, or by forcibly discharging the said aqueous solution into the distillate, or by showering it upon the surface of the distillate, through which it will then descend in slender streams or drops, or by putting the mercuric-chloride solution into a tank and discharging into this and near the bottom of the tank the distillate, which will then ascend through the aqueous solution, or by simultaneously spraying the said solution and the distillate into a suitable receptacle, or by forcing both liquids together through a tube or chamber provided with such obstructions as will cause the liquids to commingle by the force of their currents, or by any such device as a horizontal cylinder revolving on axes and having longitudinal shelves attached to and within its shell, or by any mechanical device. The proportionate quantity of mercuric chloride that may be used with the best advantage varies with circumstances and depends on the character of the distillate to be treated, the percentage of sulphur-containing and other objectionable bodies contained therein, the temperature at which the operation is to be conducted, the degree of purification required, &c., which varies with bodies to be treated, while in some cases, as in treating small quantities of distillate as quickly as possible, advantage accrues from the use of comparatively concentrated solutions of mercuric chloride, and in other cases, as in treating distillate by showering the mercuric-chloride solution upon the surface thereof, a dilute solution may be used. I prefer to use a solution composed in the proportions of one pound of the mercuric chloride in thirty, forty, or fifty pints of water. After sufficient agitation of the distillate with the mercuric-chloride solution the aqueous portion is allowed to subside, and is then drawn off from the bottom of the tank, carrying the sulphur of the oil with it and the distillate at once, or after having been washed by showering water upon its surface or by agitation with several successive portions of water is drawn off into another and so-called "precipitation-tank." In this tank the chloride of mercury which had been absorbed and retained by the distillate is to be recovered in the form of sulphide by treating the distillate with a suitable sulphide, such as hydrogen monosulphide, ammonium hydrosulphide, or sulphides of metals of the alkalies or alkaline earths. If hydrogen sulphide be used, it may be delivered in gaseous form beneath the distillate into a substratum of water or water slightly acidulated with hydrochloric acid, the gas, either mixed with atmospheric air or undiluted, being conveyed by a pipe to the bottom of the precipitation-tank, thence passing upward through the distillate in bubbles. It is well to have the delivery end of the pipe terminate in a wide cup-shaped enlargement having many perforations, so as to divide the gas into many streams of minute bubbles.

In treating fine grades of distillate I prefer to use ammonium hydrosulphide or an equivalent alkali sulphide in aqueous solution, which is to be mixed with the distillate by agitating the two together by an air-blast or any other efficient means. The quantity of sulphide used to effect the precipitation should be just sufficient to separate all the mercury from the distillate; but a slight excess of the precipitant does not appreciably injure the distillate. The required quantity of sulphide solution may be determined by calculation or by testing the distillate occasionally by removing small portions, filtering these into test-tubes, and adding thereto a few drops of ammonic sulphide, which after agitation will produce a dark discoloration if mercury be present. The use of the special sulphides herein named for converting the mercuric compound into mercuric sulphide is especially advantageous in practice when it is desired to subsequently reconvert the mercuric sulphide into mercuric chloride, which I claim in my divisional application herein, filed October 10, 1888, Serial No. 287,762. The distillate so treated is to be allowed to stand undisturbed until the sulphide of mercury shall have subsided, and the clear distillate is then to be drawn off into a suitable tank or "agitator" (which may serve also as a "settling-tank") and there washed with water. I prefer to wash the distillate by showering water upon its surface. When the water has subsided so that the distillate contains no appreciable water and is clear, I transfer the distillate to a still which contains a small quantity of alkali or alkaline earth. I prefer to use dry caustic soda or potassa in granulated form. I then redistill the hydrocarbons and treat the resulting distillate in the usual way by agitating it with a small percentage of sulphuric acid, then washing it with water followed by a dilute alkaline solution, and finally by water only. The operation of redistillation just described may be omitted without departing from my invention; but a superior grade of lamp-oil is thereby obtained. The fully-treated distillate is finally to be transferred to settling or storage tanks.

Having thus generally described my process, I will give an example of a method of treatment which will produce a valuable result; but I do not in this patent limit myself to the proportions, temperatures, or times of operation given or to the exact bodies employed. I take, for example, the distillate produced by following the process patented to Thurston Gordon Hall, November 8, 1887, No. 372,672, for "process of refining hydrocarbon-oil." When such process has been applied to Ohio petroleum—say of the kind derived from the North Baltimore fields—of this I take, say, three gallons, and I mingle with it, under suitable agitation, say, ninety-six grams of mercuric chloride dissolved in forty parts, by weight, of water. These two bodies should be thoroughly agitated together for two hours. After thorough agitation the aqueous portion is allowed to subside, thoroughly separating from the oil. The distillate is then thoroughly washed, by preference by showering water upon it in many fine streams or by agitation with successive portions of water, settling the water out after each washing. It is advisable that that washing should also be thorough. The treated distillate is then drawn into another tank and treated with ammonium sulphide in aqueous solution, which is gradually added to the solution and thoroughly mixed with it by an air-blast or other sufficient means. The quantity to be added is to be determined by the test heretofore described. The distillate is then allowed to stand until the sulphide of mercury has subsided, and the clear distillate is then drawn off into a suitable tank and again thoroughly washed with water, preferably by showering upon its surface. I then transfer the distillate to a distilling-tank where I have placed about one-half a pound of granulated caustic potash. From this still the hydrocarbon is again distilled, and agitation may be employed at this point, if desired. The resulting product is then washed and treated with about four per cent., by weight of sulphuric acid (66° Baumé) and thoroughly agitated with this acid for a period of one hour, then allowed to settle, depositing the sludge, and the distillate is then drawn from the acid, thoroughly washed, then treated with a dilute alkaline solution to neutralize the sulphuric acid, and then finally thoroughly washed. Of course it is to be understood that the distillate is separated from the water or aqueous solution after each washing or treatment. Of course some of the steps of this process may be employed with advantage without employing all of them. The alkali may be omitted in the second process of distillation, or the redistillation may be omitted altogether. In order to produce the best result, however, it is important to use the successive steps in the order stated. It is, however, essential to remove the absorbed mercury compound from the oil by some chemical process, for such mercury compound cannot be removed by washing or by the alkaline treatment, and if it remained in the oil obviously the oil would be unfit for use by reason of the poisonous mercurial fumes and for other causes.

I am aware of the patent to Thomas Restieaux, of April 9, 1867, No. 63,749, and do not claim the invention therein described.

What I claim as my invention, and desire to secure by Letters Patent, is—

1. The process of purifying mineral hydrocarbon oils herein described containing sulphur compounds, which consists in mixing the oil with mercuric chloride in solution and in subsequently removing the absorbed mercuric body from the oil by subjecting the oil to the action of a suitable sulphide, substantially as described.

2. The process of purifying mineral hydrocarbon oils herein described containing sulphur compounds, which consists in mixing the oil with mercuric chloride in solution and in subsequently removing the absorbed mercuric body from the oil by subjecting the oil to the action of a suitable sulphide, and in finally redistilling the oil in the presence of caustic alkali, substantially as described.

In testimony whereof I have signed my name to this specification in the presence of two subscribing witnesses.

EDWARD DWIGHT KENDALL.

Witnesses:
   ISAAC MARSTON,
   ISRAEL T. COWLES.